UNITED STATES PATENT OFFICE.

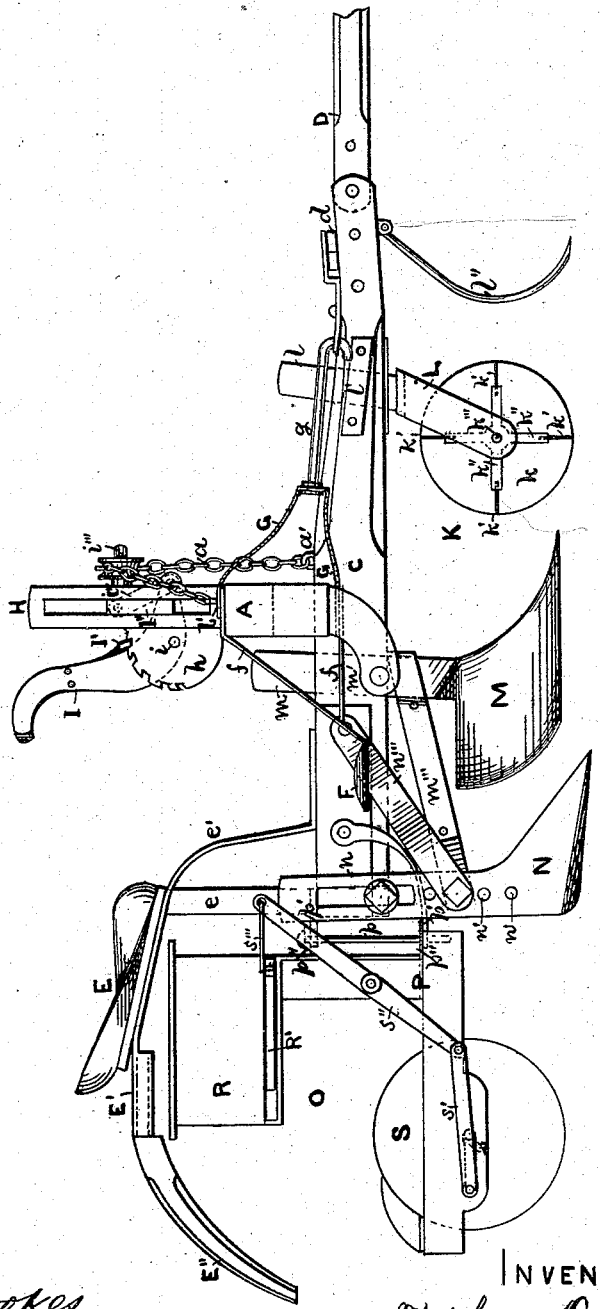

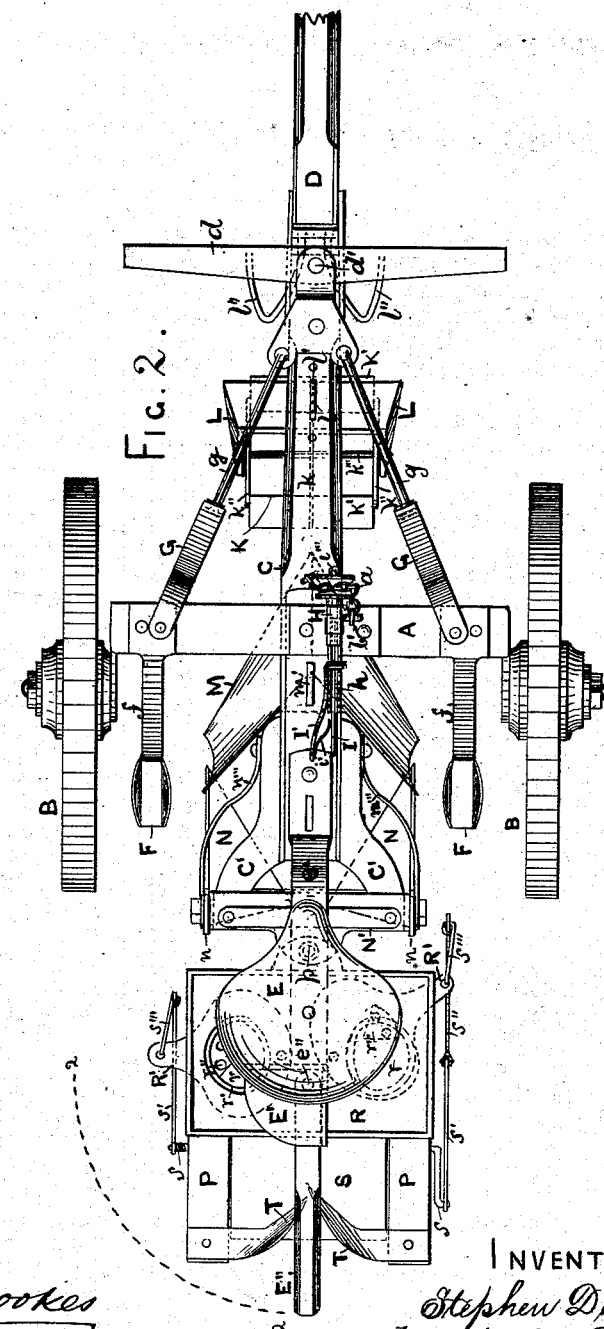

STEPHEN DIXSON, OF ROSEVILLE, ILLINOIS.

IMPROVEMENT IN COMBINED STALK-CUTTERS, PLOWS, AND SEEDING-MACHINES.

Specification forming part of Letters Patent No. 158,408, dated January 5, 1875; application filed February 24, 1874.

*To all whom it may concern:*

Be it known that I, STEPHEN DIXSON, of Roseville, Warren county, and State of Illinois, have invented certain Improvements in Combined Stalk-Cutter, Plow, and Seeding-Machine, of which the following is a specification:

My invention relates to a new and improved labor-saving agricultural implement, by means of which the operation of preparing the land for and the planting of corn are accomplished at the same time, so that the cost of putting in the corn-crop is very greatly reduced, and the work performed with much greater facility and rapidity, the machine being specially adapted for use in prairie-lands.

The invention consists in the production of a machine which will first cut up the old corn-stalks into suitable lengths for plowing under, (supposing the previous crop to have been corn,) then prepare the soil for the reception of the seed, and finally drop and cover the corn, all these operations being accomplished at one passage of the machine, as hereinafter more fully set forth.

To enable others skilled in the art to make and use my improved machine, I will now proceed to describe the same with reference to the accompanying drawings, in which—

Figure 1 is a side elevation of the machine. Fig. 2 is a top plan view of same.

Referring to the parts by letters, letter A represents an elevated axle or truck frame, supported on two wheels, B B. C is a plow-beam, to the forward end of which a draft-pole, D, is hinged or pivoted. $d$ is a double-tree, also pivoted, at $d'$, to the forward end of the beam C, the draft being arranged for two or more horses in any of the well-known ways. The rear end of the beam C is forked or bifurcated, as shown at $c' c'$, the forked ends being united by a cross-bar, $c''$. E is the driver's seat, supported by suitable standards $e\ e\ e'$, on the latter or central one of which it may be adjusted forward or back, as desired. F F are stirrups, secured, by suitable braces $f f$, to the axle A, by means of which the driver sitting on his seat can with his feet guide the machine, so as to avoid obstructions, by turning to the right or left, and can facilitate the turning of the machine at the end of the row. E' is a hollow quadrant-shaped plate, secured to the rear end of the standard $e'$; and E'' is a handle, the forward end of which is pivoted therein, at $e''$, so that it may be moved to any position on the dotted line 2 2, Fig. 2. This handle is used to guide the machine from the ground when the operator is walking, instead of riding. G G are brackets, pivoted one on each side of the elevated axle A, and connected, by rods $g\ g$, to the forward end of the plow-beam C. H is a slotted standard or upright, secured to the center or middle of the axle A, and projecting upward therefrom. $h$ is a double or slotted arc-shaped rack-bar, secured to the rear of the standard of H. I is a hand-lever, pivoted thereto, as shown at $i$, Fig. 1, its forward end passing through a slot in the standard H. I' is a pawl, pivoted to the lever I, and held in position to engage with the ratchet-teeth, by a spring $i'$. I'' is a follower or block, which is pivoted to the forward end of the lever I, by an arm, $i''$. It slides up and down in the slots of the standard H, and carries a shaft, which projects forward and outward through the standard, for the purpose of carrying a pulley, $i'''$. $a$ is a chain, which passes over the pulley $i'''$, one end being secured to the beam A, at $a'$, and the other to axle, at $b'$, as shown in Fig. 1 of the drawings.

The parts just described constitute the device for raising and lowering the plow-beam A, with its plows and cutters. When it is desired to raise the beam A the operator presses down on the lever I, the pressure first disengaging the pawl from the ratchet, and then forcing up the follower I'', causing the pulley $i'''$ to turn on the shaft, and carry the chain $a$ with it, thereby raising the beam. When the pressure is removed from the lever I the pawl engages with the ratchet, and thereby retains the beam in an elevated position until again lowered by the same means.

K represents the stalk-cutting device, consisting of a central cutting-disk or circular cutter, $k$, and a series of laterally-arranged blades or knives, $k'$. These blades $k'$ are secured at their middle to the circular cutter $k$, and at their outer ends to radial arms $k''$, the whole being mounted on a shaft, $k'''$, which is journaled in the downwardly-projecting arms of a suspending-frame, L, said frame being centrally pivoted to a post, $l$, which passes up through a slot in the beam A, as shown at $l'$ in the drawings. $l''$ $l''$ are the stalk-gatherers—two hinged rods, which hang pendent in front of the stalk-cutter in the usual manner.

The stalk-cutter can be adjusted to operate higher or lower by a set-screw which passes laterally through the beam, or by bolts and holes in the post $l$, or in any convenient and suitable manner.

In fields where there are no old corn-stalks the stalk-cutting device is detached and removed from the machine, and when desirable an ordinary circular cutter or revolving colter may be substituted for it.

M is a double mold-board plow, its post $m$ passing centrally through a slot in the beam A, as shown at $m'$. It is also made adjustable up and down on the beam by means of set-screws or bolts, as before described. N N are two scrapers or hillers, arranged immediately behind the plow M, one on each side. Their standards $n$ are slotted longitudinally, and pierced with a series of bolt-holes, $n'$. N' is a plate, secured to the rear end of the beam A, having pendent arms, to which the hillers N are adjustably secured by screw-bolts and nuts, the bolts passing through the slots in the standards $n$. $n'''$ are adjustable braces, which connect the hillers N with the beam A, and $m'''$ are braces which connect them with the plow-post $m$. O represents the corn-planting device, of which P is a frame which sustains the seed-box R, and to which the roller S is journaled. The frame P is hinged to the rear end of the beam A by means of a rod, $p$, which passes through the holes in bars or lugs $p'$ $p''$, which project from the beam A and frame P, respectively, as shown at Fig. 1.

Having thus described the construction and operation of the parts of my improved machine, I will now briefly describe its general operation.

When used to prepare land which has before been planted in corn the stalk-cutting device is secured in position in front of the plows, and all the other parts being properly adjusted the machine is then set in motion, being guided along the row of corn-stalks. The central disk of the stalk-cutter K serves to cut open the ridge or act as a colter, while the blades $k'$ cut up the stalks. The double mold-board plow M following after, then clears away the soil of the old ridge, and with it the roots and weeds which encumber the soil, leaving a smooth clean furrow of fresh soil.

The ridging-plows or scrapers N N, which follow the mold-board plow M, are adjusted to run deeper, and from the fresh soil turn up a ridge in the newly-formed furrow for the reception of the seed which is dropped therein by the corn-planting device in the rear, and covered by the roller S, the whole operation being performed at one passage of the machine.

What I claim as my invention is—

1. The combination of the beam C, plows M N N, and stalk-cutter K with the seed-planting device O R S, all constructed and operating as and for the purpose specified.

2. The stalk-cutter K, having the central disk $k$ and blades $k'$, substantially as and for the purpose specified.

3. The beam C, connected with the axle A by brackets G G and rods $g$ $g$, and adjustably suspended by means of the chain $a$, shaft $i'''$, follower I'', slotted standards H, lever I, rack $h$, and pinion I', substantially as and for the purpose specified.

STEPHEN DIXSON.

Witnesses:
PLATT R. RICHARDS,
J. J. TUNNICLIFF.